United States Patent Office 3,630,854
Patented Dec. 28, 1971

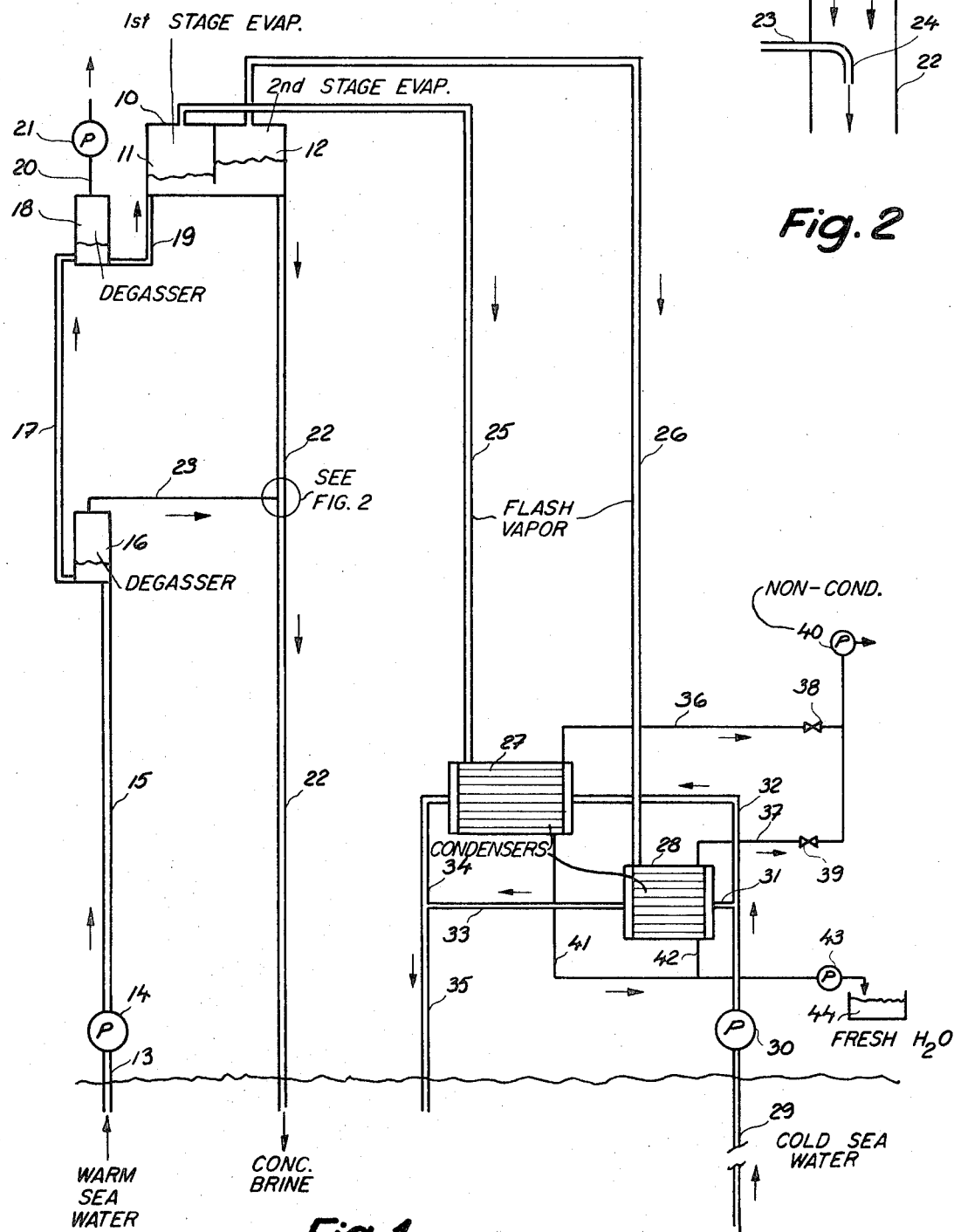

3,630,854
METHOD OF DISTILLING FRESH WATER FROM SEA WATER
Esko Ensio Huhta-Koivisto, Lumikintie 6A77, Helsinki 82, Finland, and Risto V. J. Saari, Luoma, Harjula, Finland
Filed Nov. 3, 1969, Ser. No. 873,174
Claims priority, application Finland, Nov. 5, 1968, 3,153, 3,154; Feb. 10, 1969, 412
Int. Cl. B01d 3/00, 3/02, 3/06, 3/10
U.S. Cl. 203—11  6 Claims

ABSTRACT OF THE DISCLOSURE

A continuous flow of warm sea water, e.g. surface water, is fed upwards from a supply of the warm water through a column to degassers positioned at different levels. The warm water is fed from the lowest to the highest degasser, in which gradually decreasing partial pressures, substantially higher than the partial pressures of the warm water, are established. The non-condensable gases released in the degassers are removed and the warm water is raised further through the column to evaporators through which the warm water is passed in turn. In the evaporators, gradually decreasing pressures corresponding to the gradually decreasing partial pressure of the water vapour therein, are maintained. The waste water from the last evaporator is returned to the sea downwards through another column and the vapours from each evaporator are conducted downwards separately to a corresponding condenser operated by the indirect heat exchange using a continuous stream of cold sea water obtained from the sea. Residual non-condensable gasses released on the vapourization of the warm water are removed from the condensers and the fresh water is collected from the condensers.

BACKGROUND OF THE INVENTION

Field of the invention

This invention relates to a method of producing fresh water by distilling sea water continuously.

Description of the prior art

Several methods have been developed recently to produce fresh water from sea water. The most economical have been distillation associated with power stations, particularly big nuclear power stations. These methods require high investment in the power plant and markets for the electrical energy.

Other sources of energy have therefore been sought. One vast source of energy is the heat stored in the surface layers of the sea. Most of this energy is stored in a surface layer 100–200 metres deep, below which lies stable, colder water. This thermocline is especially constant in tropical waters, where the difference in temperature between the surface water and that lying 100–200 metres furthed down is 10–14° C. The temperature difference can be increased by damming surface water to form a basin in which the sun's rays can warm it.

Prior-known methods of exploiting this heat-energy source and temperature difference have been presented in earlier publications, such as U.S. Patents 3,138,546 and 3,248,307. However, in order to produce fresh water economically from sea water the following problems should be solved:

When sea water is distilled simply by evaporating warm surface water and condensing the vapour thus produced, the natural temperature difference is utilized in three steps: the drop in temperature of the warm water in the evaporator, the difference in temperature between the vapour and the condenser, and the rise in temperature of the cooling water in the condenser. Where the temperature difference is 10° C., for instance, 3° C. can be used for evaporation without the size of the condenser or the quantity of cooling water in it becoming unreasonably large. As the evaporation heat of the water at such a low temperature is almost 600 kcal. per kilogramme, 0.5% of the water flowing through the evaporator can be evaporated. Thus the quantity of water flowing through the evaporator is 200 times that of the fresh water produced.

At atmospheric pressure, about 15 ml. of non-condensable gasses from the air are dissolved in every litre of sea water. At the pressure of water vapour—say 0.03 atmosphere—these non-condensable gasses are liberated when the water is evaporated, so that they occupy a volume of 0.5 litre for every litre of water. In other words, where the quantity of water treated in the evaporator is 200 times that of the fresh water obtained, the volume of the non-condensable gasses is 100 times that of the water produced. If these gasses are not removed, they accumulate in the vapour spaces of the evaporator and condenser, and their partial pressure raises the pressure to above that of vapourization, so that no more water is able to evaporate in the evaporator. For this reason, the water cannot be evaporated effectively (kept boiling) in a partial vacuum created merely by a barometric height difference. Unless the non-condensable gasses are removed, an excessively large evaporator is needed.

In the past it has been attempted to remove the non-condensable gasses by pumping them out of the vapour space of the evaporator or the combined vapour space of the evaporator and condenser. If about 0.5% of the water passing through the evaporator is evaporated and the specific volume of the vapour is roughly 40,000 cu. dm. (cubic decimeters) per kg., 200 cu. dm. of vapour and 0.5 cu. dm. of non-condensable gasses are released from the water flowing through the evaporator. In removing these gasses direct from the evaporator, therefore, it would be impossible to avoid removing 400 times their amount of vapour.

A common method—used in power plants, for example—is to remove the non-condensable gasses from the condenser after they have passed through it. This may raise the ratio of non-condensable gasses to the total removed to 40%, the remaining 60% being water vapour. The method has also been applied in certain prior-known distillation processes. It is technically quite possible, but pumping such a large quantity of non-condensable gasses out of the condenser at a pressure difference of nearly 1 at. requires so much energy that the cost of this work alone, in relation to the quantity of fresh water produced, is roughly the same as the total costs of the most economical known methods of desalination. Furthermore, the large amount of non-condensable gasses in the vapour reduces the heat-exchange coefficient of the condenser and increases its size.

SUMMARY OF THE INVENTION

According to the invention fresh water is produced by the following steps:

Sea water pumped from the warm surface layers of the sea or from a basin warmed by the sun is evaporated and the vapour produced is condensed by colder sea water. Non-condensable gasses dissolved in the water to be evaporated are removed before the water enters the evaporators and after the gasses have passed through the condensers.

The water to be evaporated flows through a plurality of consecutive evaporators located at a roughly barometric height from sea level, in which part of it is evaporated and the rest returned to the level from which it was pumped into the evaporators.

The vapour produced in the evaporators is condensed in corresponding condensers, which are cooled by colder sea water.

Compared with prior known methods for the production of fresh water by distilling sea water this invention offers two principal advantages.

First, the warm sea water is evaporated in several consecutive stages, and the vapour produced at each stage is condensed by colder water in a separate condenser stage. This enables more than half of the available temperature difference to be used for evaporating the warm surface water, and the cooling water in the condenser can be returned to the sea warmer than the water returning from the evaporator. The quantities of water to be treated and of non-condensable gasses to be removed are reduced substantially in ratio to the fresh water produced.

Secondly, the bulk of the non-condensable gasses dissolved in the water is removed before the water enters the evaporator, and it is removed at pressures greater than that of the vapour. This substantially reduces the pressure difference at which the gasses are pumped out and avoids pumping large quantities of vapour out with the gasses. Since the partial pressure of the gasses does not prevent the water from evaporating, the evaporators can be made small. Neither do the noncondensable gasses impede the operation of the condenser.

For the above reasons, the method according to the invention enables fresh water to be obtained from sea water economically using the vast heat reserves of the sea as the energy source. About 99.5% of the energy needed for evaporating the water is taken from the sea and only about 0.5% is required for pumping the water and gasses. The importance of the invention is enhanced by the fact that it can be applied using conventional equipment of the processing industries, such as pumps, evaporators and condensers.

BRIEF DESCRIPTION OF THE DRAWINGS

FIG. 1 is a schematic side view of a distilling apparatus for producing fresh water from sea water in accordance with one embodiment of the invention;

FIG. 2 is a detail from the apparatus in FIG. 1 in enlarged scale, illustrating specifically a means for combining the non-condensable gasses from the first degasser with the waste water.

DESCRIPTION OF THE PREFERRED EMBODIMENTS

Figure 3:
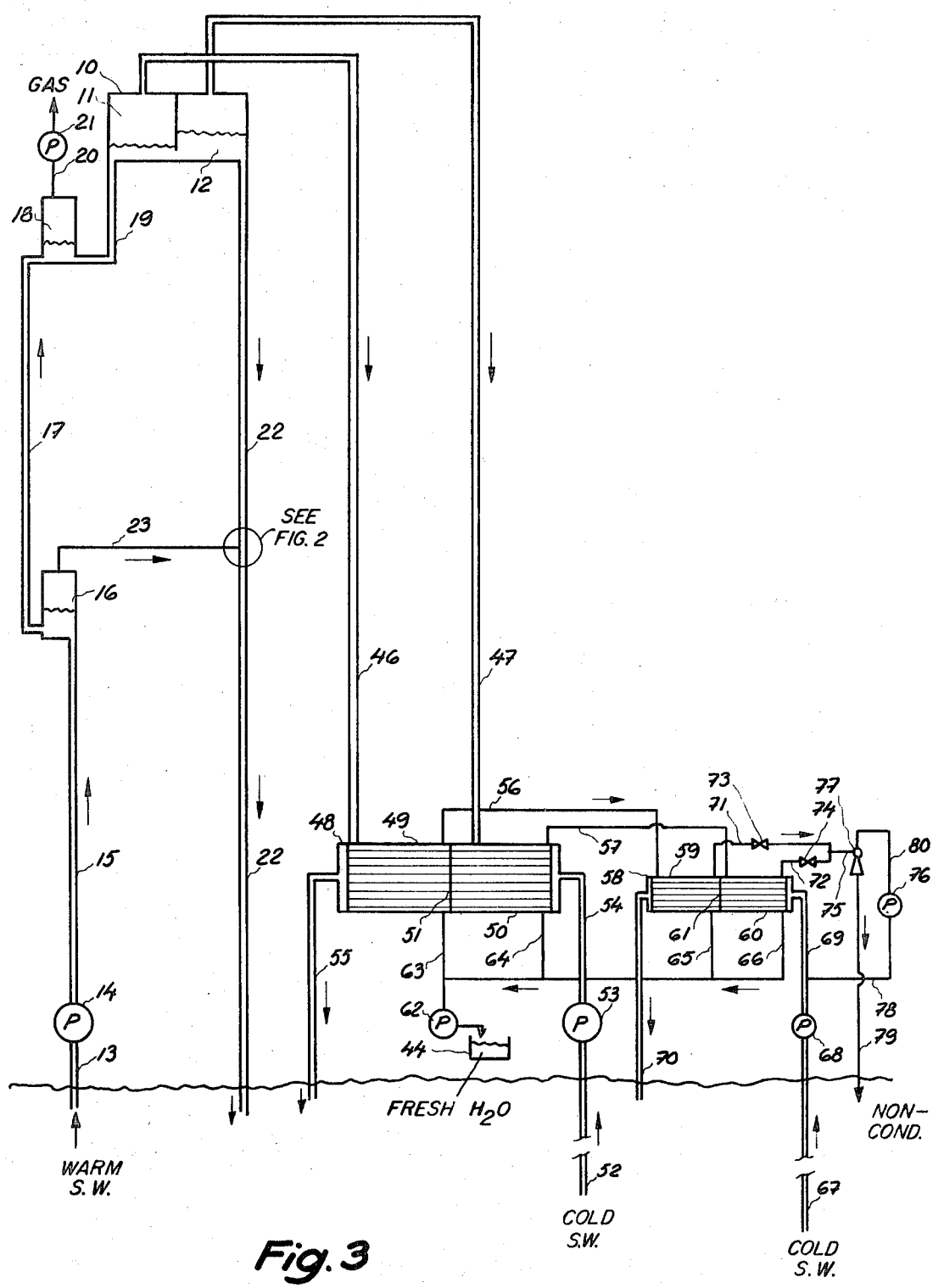
FIG. 3 is a schematic view of another apparatus for carrying out the method according to the invention.

In FIG. 1, warm surface water from the sea is evaporated in an evaporator 10 at a roughly barometric height from sea level and the vapour produced is condensed by condensers 27 and 28. The water to be evaporated is taken from the sea through a pipe 13 by a pump 14 and flows through a pipe 15 to a degasser 16, and from there on through a pipe 17 to another degasser 18. The water level in the latter is higher than in degasser 16, but lower than in the evaporator 10. From the degasser 18, the water goes along a pipe 19 to the first stage 11 and second stage 12 of the evaporator 10, and from there through a pipe 22 back to the sea. Alternatively, the pump 14 can be connected to the pipe 22. Variations in the sea level can be partly counteracted by connecting the pump to pipe 15 at low water and to pipe 22 at high water.

Subatmospheric pressures proportional to the differences in height prevail in the degassers 16 and 18, and in any case they are greater than the water-vapour pressure in the evaporator 10. Quantities of non-condensable gasses proportional to these pressures are released in both the degassers 16 and 18. If, for example, degasser 16 is 5 metres above sea level, about 50% of the non-condensable gasses are released from the water in it. In addition, a quantity of vapour is released along with the non-condensable gasses, this quantity being proportional to the ratio between the pressure of the vapour and the partial pressures of the gasses. For this reason the degassers are placed below the evaporator to avoid removing unnecessary quantities of vapour with the gasses. The degasser can be a simple enclosed container, in the upper part of which the gasses accumulate.

FIG. 1 shows two different ways of removing non-condensable gasses from a degasser. From degasser 18 they are removed by a pump 21 along a pipe 20 to the outer air. If there are several stages of degassing, as would be economical in a big plant, the non-condensable gasses can be removed from the degassers by a multi-stage pump in which the suction pressures of the different stages correspond to the pressures in the degassers. From degasser 16, the gasses are removed by conducting them via a pipe 23 into pipe 22, along which they proceed together with the waste water returning from the evaporator to the sea. As this water does not contain any non-condensable gasses and is colder than the water entering the degasser 16, the non-condensable gasses redissolve into it. To promote this process, pipe 23 may enter pipe 22 in the form 24 shown in FIG. 2, so that the water flowing along pipe 22 sucks the gasses along with it.

When the water flows through the first stage 11 of the evaporator, part of it (e.g. 0.35%) is evaporated by extracting heat from it, and the water becomes 2° C. cooler. The cooled water flows on to stage 12, in which the pressure is lower, corresponding to the lower water temperature. A corresponding amount of water evaporates here, too, and about 99.3% of the original quantity of water returns to the sea, cooled by 4° C. The vapour produced in stage 11 flows along a pipe 25 to the condenser 27 and that produced in stage 12 along a pipe 26 to the condenser 28. The condensers 27 and 28 are cooled by colder water brought to them from the sea depths via a pipe 29, pump 30, and pipes 31 and 32. The return water from them enters the sea via pipes 33, 34 and 35.

The condensers 27 and 28 are located below the evaporater 10, near sea level, to prevent the air dissolved in the cooling water from being released and impeding the cooling water flow through the condensers 27 and 28. If the same quantity of water flows through the condensers as through the evaporator, the cooling water is warmed by an average of 4° C. If the cooling water is 10° C. colder than the water to be vapourized, for example, and is divided equally between the two condensers, the mean temperature difference is 6° C. in condenser 27 and 4° C. in condenser 28. The fresh water is taken from the condensers along pipes 41 and 42 by a pump 43 into a freshwater tank 44.

As the pressure prevailing in the degassers 16 and 18 is greater than that of the water vapour, only a small part of the non-condensable gasses dissolved in the water are released in the evaporator 10 itself. These gasses, whose quantity is insignificant compared to the vapour, flow with the vapour to the condensers 27 and 28 and after the vapour has condensed, the gasses are removed by a pump 40 from the condensers along pipes 36 and 37. Valves 38 and 39 in pipes 36 and 37 respectively control the flow of these gasses and the pressure difference between condensers 27 and 28.

The condensers for the different evaporation stages can also be arranged so that the same cooling water flows through more than one, consecutively. FIG. 3 shows an example of this embodiment: the vapour space of a condenser 48 is divided by a partition 51 into two compartments 49 and 50. Cooling water brought from the sea depths via a pipe 52, pump 53 and pipe 54 to condenser 48 first enters compartment 50, where it becomes warmer. From there it goes on to compartment 49, becomes still warmer, and finally returns to the sea through a pipe 55. The vapour from the higher-temperature evaporator stage 11 flows through a pipe 46 to compartment 49, in which the cooling water is warmer than that in compartment 50. Similarly, the vapour from the cooler evaporator stage 12 passes through a pipe 47 to the cooler condenser stage. In this way, the same temperature difference between the vapour and cooling water can be achieved in both condenser stages.

This arrangement enables more than half of the temperature difference between the deep water and surface water to be used for evaporating the latter. If the temperature difference is 10° C., for example, and the surface water is cooled by 3° C. in each evaporator stage (6° C. in both) so that about 1% of it is evaporated, and if the cooling water becomes 3° C. warmer in each condenser stage (6° C. in both), then 60% of the total temperature difference is utilized for evaporation and the cooling water returns to the sea 2° C. warmer than the water returning from the evaporator 10. In this case, the temperature differnce between the vapour and cooling water in the condensers averages 2.5° C. This temperature difference can be increased by employing several distillation stages. If there are six such stages, the temperature difference in an apparatus of the type described here is 3.5° C.

FIG. 3 also shows an example of how the removal of non-condensable gasses from the condenser can be facilitated and the heat-exchange coefficient of the condenser improved by condensing vapour from the same evaporation stage in more than one consecutive condensers. The vapour space of the auxiliary condenser 58, like that of the main condenser 48, is divided into two compartments 59 and 60 by a partition 61. Cooling water colder than that for the main condenser, being brought from a greater depth, goes to the auxiliary condenser 58 via a pipe 67, pump 68 and pipe 69. It passes first through compartment 60, then through compartment 59, and then back to the sea via a pipe 70. Alternatively, depending on the temperature, it can be fed into the inlet pipe 54 of the main condenser 48. Some of the vapour in compartment 49 of the main condenser, together with non-condensable gasses, flows along a pipe 56 to the compartment 59 of the auxiliary condenser 58, in which it is condensed by the colder cooling water and the proportion of non-condensable gasses in the mixture grows. Similarly, some of the vapour from compartment 50 of the main condenser 48 flows into compartment 60 of the auxiliary condenser through pipe 57. The non-condensable gasses are sucked out of the auxiliary condenser via pipes 71, 72 and 75 into a water-jet ejector 77, from where they return to the sea via a pipe 79. Water is fed from the cooling-water inlet pipe 69 into the ejector by a pump 76, via pipes 78 and 80. The flow of gasses into the ejector 77 is regulated by valves 73 and 74 in pipes 71 and 72, respectively. The fresh water is sucked from the condensers 48, 58 by a pump 62 via pipes 63, 64, 65 and 66 to a freshwater tank 44.

There can also be more than one consecutive auxiliary condenser, cooled in some other prior-known manner—for instance, by refrigeration machinery. The vapour can be forced from the main to the auxiliary condenser by a pump connected to pipes 56 and 57. The non-condensable gasses can be removed by some other prior-known pump, such as an ejector through which the fresh water flows. Auxiliary condensers can be used to decrease the proportion of vapour in the gas mixture and reduce the pumping energy required, regardless of the type of pump employed. They can also be used to improve the heat exchange in the main condensers by keeping the vapour flowing at an adequate velocity, so that the non-condensable gasses do not accumulate in the condensers and impede condensation.

The above are a few embodiments of the invention. For clarity in the drawings, they have been limited to two stages in degassing, evaporation and condensation. The method can be optimized in one or more ways in each case, depending on circumstances such as the size of the plant, the water temperatures, the possibility of damming a basin, the distances of the cooling water to be pumped, the amount of gasses dissolved in the water and the price of the equipment and energy. The parameters for this optimation are the number of evaporation stages, the proportion of warm water to be evaporated, the number of condensers, the quantities and temperatures of the cooling water flowing through the condensers, the number of degassing stages and the pressure prevailing in them, and the technique used to pump out the non-condensable gasses.

We claim:

1. A method of producing fresh water by distilling sea water continuously, comprising:

feeding a continuous flow of relatively warm sea water, upwards from a supply of the warm water through a first column to a plurality of degassing spaces lying at different levels, from the lowest to the highest, consecutively establishing in the degassing spaces successively decreasing partial pressures in ascending order, substantially higher than the partial pressure of the warm sea water to release in steps the bulk of non-condensable gasses dissolved in the warm sea water;

removing the non-condensable gasses in the degassing spaces of different partial pressures;

raising the warm sea water further through the first column to a plurality of flash evaporation spaces of successively higher vacuum;

passing the warm sea water through each evaporation space in turn; gradually decreasing pressures, corresponding to the gradually decreasing partial pressure of the water vapour therein, being maintained in the evaporation spaces to evaporate a small part of the water;

feeding the waste sea water from the last evaporation space downwards through a second column to a discharge point at substantially the same level as the inlet of the first column;

conducting the vapours from each evaporation space downwards separately to a corresponding condensation space, in which they are condensed into fresh water by indirect heat exchange, using a continuous stream of relatively cold sea water obtained from the sea at depths appreciably below that of the surface water;

removing the residual non-condensable gasses released on the vapourization of the warm sea water from the condensation spaces, into which they have flowed, together with the vapour, from the evaporating spaces; and collecting the condensed fresh water from the condensation spaces.

2. The method as recited in claim 1, wherein the non-condensable gasses from at least one degassing space are removed, combined with and ejected by the waste water returning from the evaporation spaces to the sea via the second column.

3. The method as recited in claim 1, wherein the condensation spaces are cooled by separate continuous streams of cold water.

4. The method as recited in claim 3, wherein:

the streams of cold sea water are brought from different depths to provide cooling water of different temperatures; and the streams of cold sea water of different temperatures are used to cool different condensation spaces in such a way that the coldest stream is fed to the condensation space into which the vapour of the lowest pressure is conducted.

5. The method as recited in claim 1, wherein the stream of cold sea water is fed through a plurality of condensation spaces starting from the condensation space having the lowest vapour pressure and ending with that having the highest vapour pressure.

6. The method as recited in claim 1, wherein:
each stream of vapour is condensed in a series of two condensation spaces;
the residual non-condensable gasses are removed from the second condensation space; and
the flow area of the condensation spaces is decreased gradually in the direction of flow of the vapour.

References Cited

UNITED STATES PATENTS

| 2,490,659 | 12/1949 | Snyder | 202—205 |
|---|---|---|---|
| 2,636,129 | 4/1953 | Agnew | 159—1 S X |
| 2,716,446 | 8/1955 | Ross | 159—1 G |
| 3,218,241 | 11/1965 | Checkovich | 203—88 X |
| 3,330,740 | 7/1967 | Duffy | 202—205 X |
| 3,347,753 | 10/1967 | Morse | 202—185 |
| 3,367,845 | 2/1968 | Coit et al. | 203—11 X |
| 3,536,591 | 10/1970 | Lotz | 159—18 X |

FOREIGN PATENTS

| 1,300,526 | 9/1961 | France. |
|---|---|---|
| 838,722 | 5/1952 | Germany. |
| 442,502 | 11/1948 | Italy. |

NORMAN YUDKOFF, Primary Examiner

J. SOFER, Assistant Examiner

U.S. Cl. X.R.

203—88, 91; 202—173, 186, 205